(No Model.)
L. GODDU.
WORK HOLDING DEVICE.
No. 475,729. Patented May 24, 1892.
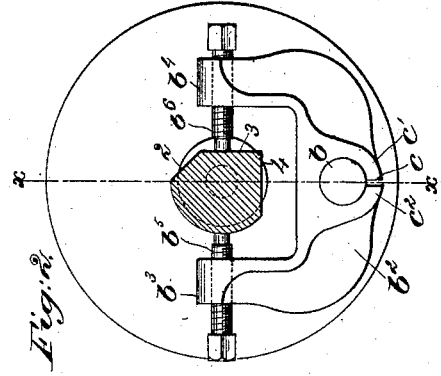
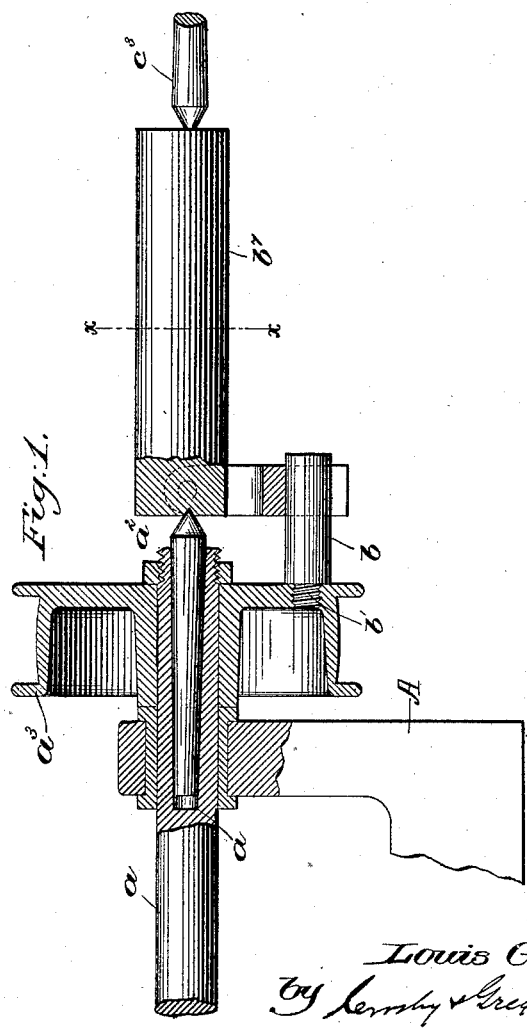
Witnesses.
Fred S. Greenleaf.
Edward F. Allen.
Inventor:
Louis Goddu.
by Crosby & Gregory Attys.

UNITED STATES PATENT OFFICE.

LOUIS GODDU, OF WINCHESTER, ASSIGNOR TO JAMES W. BROOKS, OF CAMBRIDGE, AND FRANK F. STANLEY, OF SWAMPSCOTT, MASSACHUSETTS, TRUSTEES.

WORK-HOLDING DEVICE.

SPECIFICATION forming part of Letters Patent No. 475,729, dated May 24, 1892.

Application filed November 16, 1891. Serial No. 412,075. (No model.)

*To all whom it may concern:*

Be it known that I, LOUIS GODDU, of Winchester, county of Middlesex, State of Massachusetts, have invented an Improvement in Work-Holding Devices, of which the following description, in connection with the accompanying drawings, is a specification, like letters on the drawings representing like parts.

This invention relates to a holding device or clamp adapted to be used on lathes with work having an irregular outline or circumference.

My invention has for its object to provide a simple and efficient clamp or holding device adapted to engage work of irregular outline and to hold the same firmly in place.

My invention therefore consists in the combination, with a revoluble head or chuck provided with a stud or projection, of a clamp or work-holding device consisting of a yoke mounted upon the said stud and split to form binding-jaws, and set-screws to engage the work and render the clamping-yoke fast on its stud, substantially as will be described.

Other features of my invention will be pointed out in the claim at the end of this specification.

Figure 1 is a partial section and elevation of a sufficient portion of a lathe provided with my improved clamp or holding device to enable my invention to be understood, the section being taken on line $x\ x$, Fig. 2; and Fig. 2, a sectional view of the apparatus shown in Fig. 1 on the line $x'\ x'$, looking toward the left.

The standard A, the shaft $a$, provided with the socket $a'$ for the reception of the centering-point $a^2$, and the pulley $a^3$, fast on the said shaft to revolve therewith, may be of any usual or well-known construction common to lathes. The pulley $a^3$ has secured to it a stud $b$, herein shown as provided with a screw-threaded extension $b'$ to enter a screw-threaded socket or opening in the pulley.

The stud $b$ has mounted upon it my improved clamp or work-holding device, herein shown as a yoke $b^2$, provided with arms or forks $b^3\ b^4$, having threaded openings, through which are extended the set-screws $b^5\ b^6$ to engage the piece of work, which is herein shown as a shaft $b^7$, provided, as represented in Fig. 2, at one end with an irregular outline, it having substantially straight faces, (marked 2 3 4.) The yoke $b^2$ is fitted closely upon the stud $b$ and is split, as at $c$, to form spring-jaws $c'\ c^2$, which normally are disengaged from the stud $b$, but which are adapted to be brought in contact with and bind upon the said stud when the set-screws $b^5\ b^6$ are engaged with the piece of work.

In operation the work $b^7$ is supported at its opposite ends by the centering points or spindles $a^2\ c^3$, only a portion of the latter being shown in Fig. 1, and after the work $b^7$ has been centered the said work is firmly clamped or secured to the revolving pulley or chuck $a^3$ by rotating the set-screws $b^5\ b^6$ until they are brought into engagement with the periphery or circumference of the work, and after being brought into such engagement and the set-screws $b^5\ b^6$ tightened the spring-jaws $c'\ c^2$ of the yoke are made to firmly clamp the stud $b$, and thus firmly secure the work and the clamping-yoke to the revoluble pulley or chuck $a^3$ without any liability of end or shaking motion. The clamping-yoke $b^2$, being normally loose on the stud $b$ when the set-screws $b^5\ b^6$ are not screwed in snugly, may be turned into any desired position, so as to engage work of any irregular outline and be moved longitudinally on the stud $b$ according to the work to be done, and after the work has been thus engaged the clamping-yoke may again be made fast on its stud $b$, as above described.

The set-screws are arranged one just opposite the other, or in line, so that the work is held in the line of its center, and strain on the screws has no tendency to force the work out of center.

This invention may be used to hold work in any usual machine.

I have herein shown the stud $b$ as attached to a rotating pulley; but this invention is not limited to mounting the said stud on a pulley, as, if desired, the said stud may be held by an ordinary face-plate of a lathe or other tool.

I claim—

A clamp or work-holding device consisting, essentially, of a yoke split to form binding-jaws and having set-screws to engage the work, combined with a stud or projection on which the said jaws are clamped by the movements of the said set-screws, substantially as described.

In testimony whereof I have signed my name to this specification in the presence of two subscribing witnesses.

LOUIS GODDU.

Witnesses:
G. W. GREGORY,
EMMA J. BENNETT.